March 20, 1956   J. W. GLASS   2,738,951
JACK

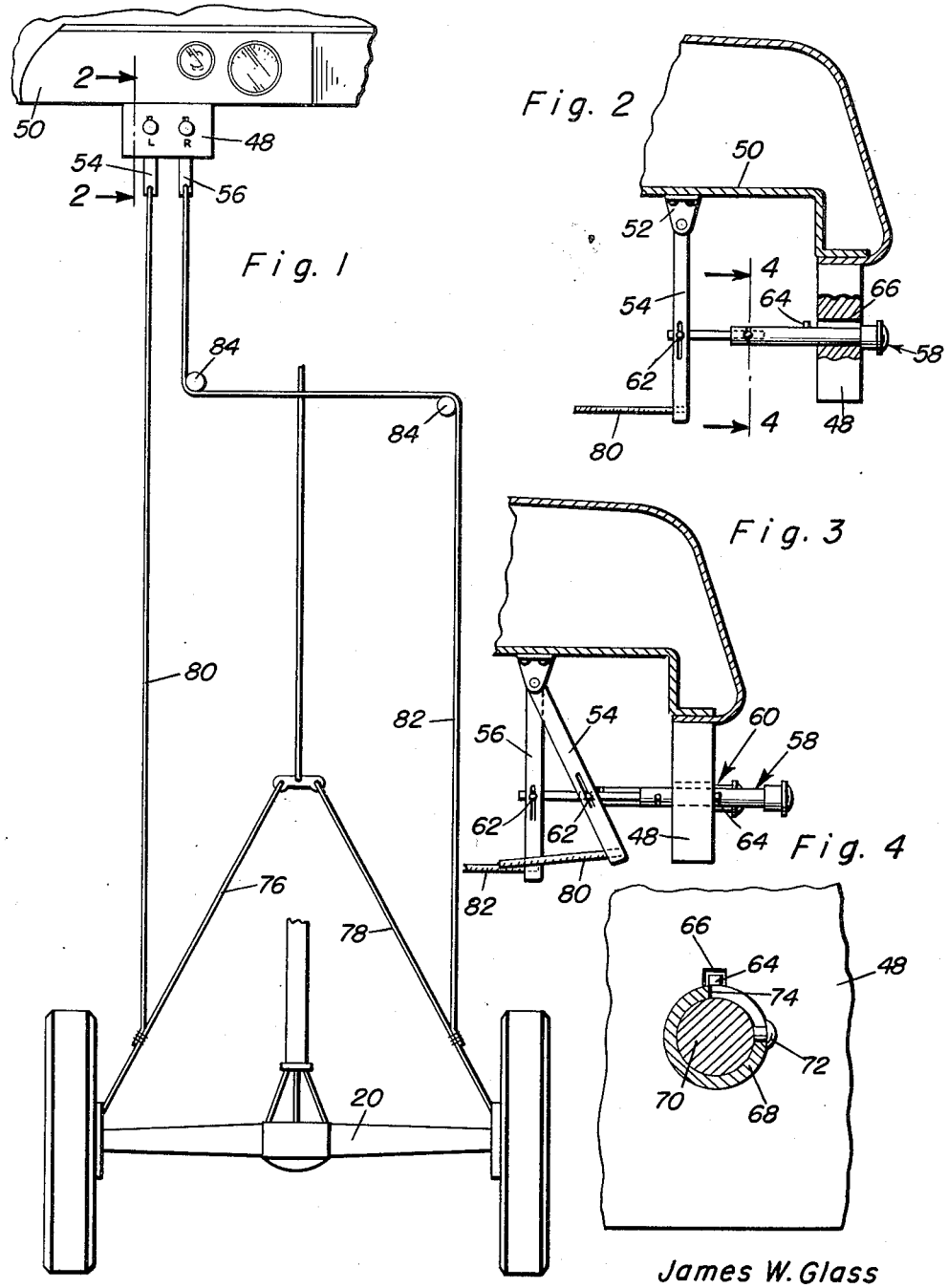

Filed March 19, 1953   2 Sheets-Sheet 2

James W. Glass
INVENTOR.

BY Clarence A. O'Brien
and Harvey B. Jacobson
Attorneys

United States Patent Office 2,738,951
Patented Mar. 20, 1956

2,738,951
JACK

James W. Glass, New Castle, Pa., assignor of twenty per cent to Arthur Lusk and twenty-six and two-thirds per cent to Joseph Solomon, both of New Castle, Pa.

Application March 19, 1953, Serial No. 343,457

1 Claim. (Cl. 254—94)

This invention relates to new and useful improvements in vehicle lifting apparatus and the primary object of the present invention is to provide an axle engaging means which will effectively lift the rear axle of a vehicle as the vehicle is backed up.

Another important object of the present invention is to provide a jack including an axle mounted socket member and a base supporting a vertically swingable arm pivoted to the base and engaged with the socket member so that as the arm is raised the axle, on which the socket member is mounted, will be raised.

A further object of the present invention is to provide an emergency brake cable actuating means operated from the instrument panel of a vehicle so that the wheel being lifted may be held against rotation as its tire is repaired or replaced.

A still further aim of the present invention is to provide a vehicle lifting apparatus of the aforementioned character that is simple and practical in construction, strong and reliable in use, efficient and durable in operation, inexpensive to manufacture, install and service, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a diagrammatic view showing the emergency brake cable operating means used in the present invention;

Figure 2 is an enlarged detail vertical sectional view taken substantially on the plane of section line 2—2 of Figure 1;

Figure 3 is a view similar to Figure 2 but showing one of the brake operating plungers moved to its active position;

Figure 4 is an enlarged detail vertical sectional view taken substantially on the plane of section line 4—4 of Figure 2;

Figure 5:
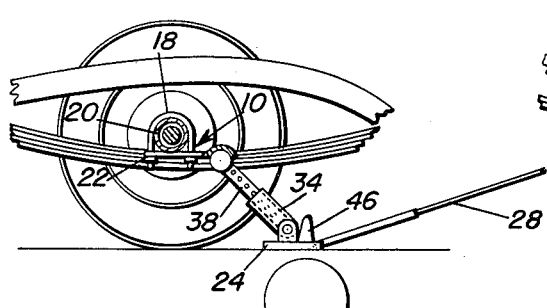
Figure 5 is a diagrammatic view showing the step of placing the rear axle jack in position.
Figure 6:
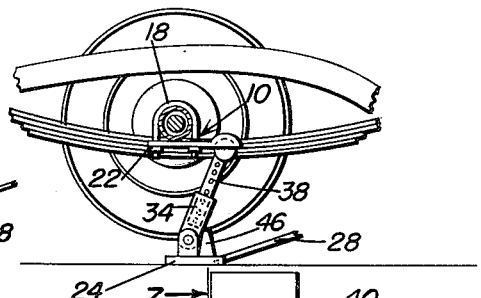
Figure 6 is a view similar to Figure 5 but showing the axle raised.
Figure 7:
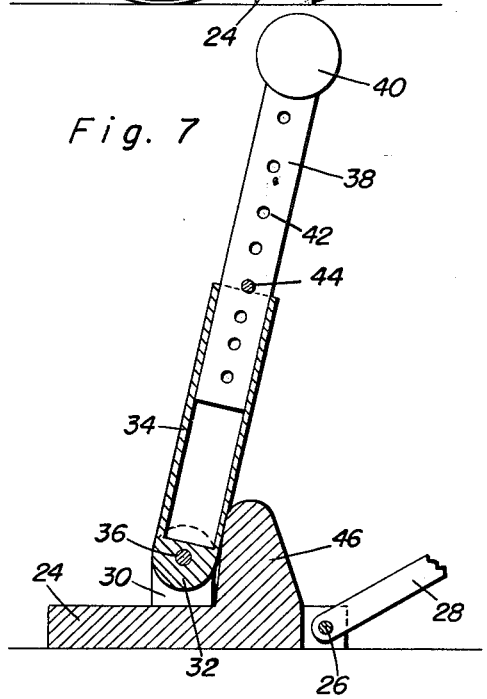
Figure 7 is a vertical sectional view taken substantially on the plane of section line 7—7 of Figure 8.
Figure 8:
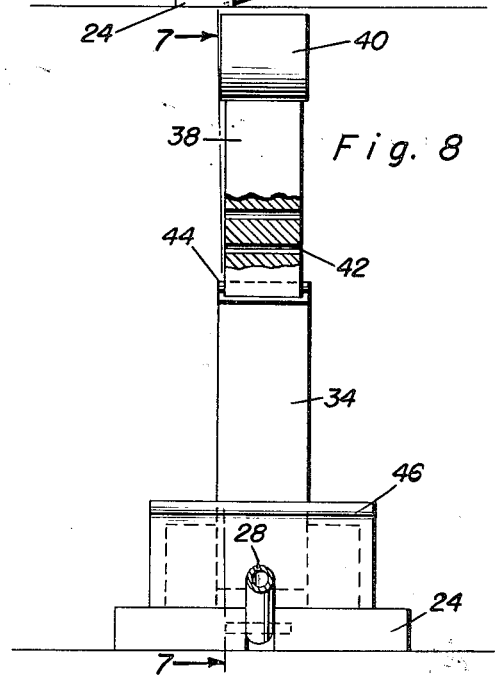
Figure 8 is a rear elevational view of the jack member and with parts broken away and shown in section; and, Figure 9 is a perspective view of the socket member used in the present invention.
Figure 9:
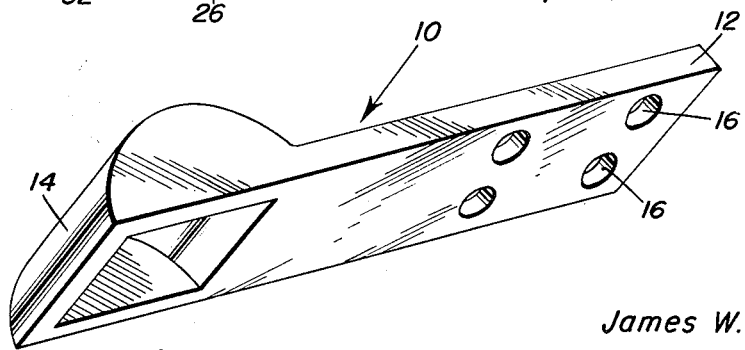

Referring now to the drawings in detail, wherein for the purpose of illustration, there is disclosed a preferred embodiment of the present invention, the numeral 10 represents a socket member including a rigid arm 12 having a downwardly facing concave socket or seat 14 at one end. The end of arm 12 remote from seat 14 is provided with pairs of apertures 16 that receive the threaded ends of U-bolts 18 which are engaged over the rear axle 20 of a vehicle. Nuts 22 are threaded on the ends of U-bolts 18 and are tightened to clamp the arm 12 against the undersurface of axle 20.

A base 24 is intended to underlie the socket member 10. Base 24 is pivotally attached, as at 26, to a handle 28 whereby the base may be readily positioned under the socket member 10. A pair of ears 30 extend upwardly from the base 24 and are spaced apart to receive therebetween the lower eye end 32 of a tubular arm section 34. A pivot pin 36 extends through the ears 30 and eye end 32 to secure the arm section 34 to the base 24.

An upper arm section 38 is slidably received in section 34 and fixedly supports a cylindrical element 40 at its upper end that will seat in the socket 14. The arm section 38 is provided with longitudinally spaced apertures 42 for selectively receiving a removable pin 44 whose ends rest against the upper end of section 34 to retain the section 38 adjusted longitudinally of the section 34. A rigid ledge 46 extends upwardly from the base 24 behind the ears 30 to limit upward and rearward swinging movement of arm sections 34 and 38.

Means is provided for applying the wheel brakes to a selected rear wheel on the axle 20. This means comprises a guide and support block 48 suitably mounted on the instrument panel 50 of the vehicle. A bracket 52 secured to the instrument panel 50 in front of the block 48 pivotally supports a pair of levers 54 and 56.

Block 48 is formed with two apertures that face the levers 54 and 56. These apertures slidably receive plungers 58 and 60 whose forward ends are pivotally and slidably secured to the levers 54 and 56, as at 62. The plungers 58 and 60 each support a rigid lug 64 that will pass through keyways 66 in the block 48 so that the plungers may be pulled rearwardly and rotated to return the plungers rearwardly. The plungers are each provided with tubular rear sections 68 and rod-like forward sections 70. The sections 70 carry headed lugs 72 that are movable in slots 74 in the rear sections 68, whereby sections 68 may be rotated relative to sections 70.

The rear wheel emergency brake operating cables 76 and 78 are attached to the rear ends of cables 80 and 82 by any suitable means. The forward ends of the cables 80 and 82 are suitably attached to the levers 54 and 56. Cable 82 extends about pulleys 84 suitably mounted on the vehicle.

In practical use of the present invention, the cable 80 or 82 to the brake of the wheel that is to be raised is pulled to a brake applying position by its associated plunger 58 or 60. Then the socket member 10 is adjusted on the axle 20 to be disposed relatively close to the wheel that is to be raised. The base 24 is slid under the socket member 10 and the arm section 34, 38 are raised until the element 40 enters socket 14. The vehicle is backed up and the arm sections 34, 38 will swing upwardly and rearwardly against ledge 46 to cause a raising of the axle 20.

What is claimed as new is as follows:

A vehicle jack comprising a bracket for attachment to a vehicle axle, said bracket having a downwardly opening semi-cylindrical socket therein, a base member positionable on the ground surface under the bracket and initially spaced therefrom in the direction of movement of the axle, an elongated longitudinally adjustable arm pivotally attached at its lower end to the base member, a generally cylindrical end portion on the upper end of the arm freely removably seated in said socket for imparting lateral stability to the bracket, and an abutment on said base member for engaging the arm and limiting the pivotal movement thereof in one direction for supporting the axle in elevated position, said upper end of the arm being engaged in the socket with the arm inclined in an initial direction, the movement of the axle pivoting the arm past the vertical position to an oppositely inclined position and into engagement with the abutment thereby elevating the axle until the axle is moved in an opposite direction which movement pivots the arm to the initial position whereby the arm and base are freely removable.

References Cited in the file of this patent

UNITED STATES PATENTS

| | | |
|---|---|---|
| 1,680,228 | Marty | Aug. 7, 1928 |
| 1,923,190 | Couch et al. | Aug. 22, 1933 |
| 2,343,459 | Hines | Mar. 7, 1944 |

FOREIGN PATENTS

| | | |
|---|---|---|
| 964,040 | France | Jan. 18, 1950 |